US005581666A

United States Patent [19]

Anderson

[11] Patent Number: 5,581,666
[45] Date of Patent: Dec. 3, 1996

[54] MODULAR ARCHITECTURE FOR ROBOTICS AND TELEOPERATION

[76] Inventor: Robert J. Anderson, 11908 Ibex Ave., N.E., Albuquerque, N.M. 87111

[21] Appl. No.: 432,376

[22] Filed: May 1, 1995

Related U.S. Application Data

[63] Continuation of Ser. No. 101,996, Aug. 4, 1993, abandoned.

[51] Int. Cl.$^6$ .................................................. G06F 15/00
[52] U.S. Cl. ........................................... 395/98; 395/99
[58] Field of Search ......................................... 395/95, 98

[56] References Cited

U.S. PATENT DOCUMENTS

| 5,038,089 | 8/1991 | Szakaly | 395/86 |
| 5,046,022 | 9/1991 | Conway et al. | 395/85 |
| 5,231,693 | 7/1993 | Backes et al. | 395/99 |
| 5,266,875 | 11/1993 | Slotine et al. | 395/95 |

OTHER PUBLICATIONS

R. J. Anderson and M. W. Spong, "Asymptotic Stability for Force Reflecting Teleoperators with Time Delay," *The International Journal of Robotics Research*, vol. 11, pp. 135–149, 1992.

R. J. Anderson and M. . Spong,"Bilateral Control of Teleoperators with Time Delay," *IEEE Transactions on Automatic Control*, vol. 34, pp. 494–501, 1989.

P. G. Backes and K. S. Tso, "UMI: An Interactive Supervisory and Shared Control System for Telerobotics," IEEE International Conference on Robotics and Automation, CH. 2876, pp. 1096–1101, 1990.

A. K. Bejczy and Z. Szakaly, "Universal Computer Control System (UCCS) for Space Telerobots," *International Conference on Robotics and Automation*, CH. 2413, pp. 318–324, 1987.

P. T. Boissiere and R. W. Harrigan, "An Alternative Approach to Telerobotics: Using a World Model and Sensory Feedback," *Third Topical Meeting on Robotics and Remote Systems*, pp. 1–9, 1989.

R. A. Brooks, "A Robust Layered Control System for a Mobile Robot," *IEEE Journal of Robotics and Automation*, vol. RA–2, No. 1, pp. 14–23, 1986.

J. E. Colgate, "Power and Impedance Scaling in Bilateral Manipulation," *IEEE International Conference on Robotics and Teleoperation*, pp. 2292–2297, 1991.

S. Graves, L. Ciscon and J. D. Wise, "A Modular Software System for Distributed Telerobotics," *IEEE International Conference on Robotics and Automation*, pp. 2783–2785, 1992.

S. Hayati, T. Lee, K. Tso and P. Backes, "A Testbed for a Unified Teleoperated–Autonomous Dual–Arm Robotic System," *IEEE International Conference on Robotics and Automation*, CH. 2876, pp. 1090–1095, 1990.

V. Hayward and R. Paul, "Robot Manipulator Control Under UNIX RCCL: A Robot Control 'C' Library," *International Journal of Robotics Research*, vol. 5, No. 4, pp. 94–111, 1987.

N. Hogan, "Impedance Control: An Approach to Manipulation," *ASME Journal of Dynamic Systems, Measurements, and Control*, vol. 107, pp. 1–7, 1985.

R. Lumia, J. Fiala and A. Wavering, "The NASREM Robot Control System Standard," *Robotics & Computer–Integrated Manufacturing*, vol. 6, No. 4, pp. 303–308, 1989.

(List continued on next page.)

*Primary Examiner*—Robert W. Downs
*Attorney, Agent, or Firm*—Jeffrey D. Myers; Timothy D. Stanley

[57] ABSTRACT

Systems and methods for modularization and discretization of real-time robot, telerobot and teleoperation systems using passive, network based control laws. Modules consist of network one-ports and two-ports. Wave variables and position information are passed between modules. The behavior of each module is decomposed into uncoupled linear-time-invariant, and coupled, nonlinear memoryless elements and then are separately discretized.

24 Claims, 10 Drawing Sheets

OTHER PUBLICATIONS

D. J. Miller and R. C. Lennox, "An Object–Oriented Environment for Robot System Architectures," *IEEE International Conference on Robotics and Automation,* CH. 2876, pp. 352–361, 1990.

G. Raju, G. C. Verghese and T. B. Sheridan, "Design Issues in 2–port Network Models of Bilateral Remote Manipulation," *IEEE International Conference on Robotics and Automation,* CH. 2750, pp. 1316–1321, 1989.

L. Salkind, "The SAGE Operating System," *IEEE International Conference on Robotics and Automation,* CH. 2750, pp. 860–865, 1989.

E. M. Sollbach and A. A. Goldenberg, "Real–Time Control of Robots: Strategies For Hardware and Software Development," *Robotics & Computer–Integrated Manufacturing,* vol. 6, No. 4, pp. 323–329, 1989.

D. B. Stewart, D. E. Schmitz and P. K. Khosla, "Implementing Real–Time Robotic Systems Using CHIMERA II," *IEEE International Conference on Robotics and Automation,* pp. 598–603, 1990.

Niemeyer et al, "Transient Shaping in Force Reflecting Teleoperation", IEEE Int'l Conf on Advanced Robotics, Jun. 19–22 1991 pp. 261–266 vol. 1.

Hannaford et al, "Experimental and Simulation Studies of Hard Contact in Force Reflecting Teleoperation", IEEE Int'l Conf on Robotics & Automation, pp. 584–589 vol. 1 Apr. 24–29, 1988.

Andriot et al, "On the Bilateral Control of Teleoperators with Flexible Joints and Time Delay by Passive Approach", 5th Int'l Conf on Advanced Robotics in Unstructured Environments, Jun. 19–22 1991, pp. 231–236 vol. 1.

Anderson et al, "Bilateral Control of Teleoperators with Time Delay", IEEE Transactions on Automatic Control, vol. 34 iss. 5, May 1989, pp. 494–501.

Anderson et al, "Asymptotic Stability for Force Reflecting Teleoperators with Time Delay", Int'l Journal of Robotics Research, vol. 11, pp. 135–149, 1992.

Raju et al, "Design Issues in 2–port Network Models of Bilateral Remote Manipulation", IEEE Conf on Robotics & Automation, pp. 1316–1321, 1989.

Anderson et al, "Bilateral Control of Teleoperators with Time Delay", Proc of 27th Conf on Decision & Control, Dec. 1988, pp. 167–173 vol. 1.

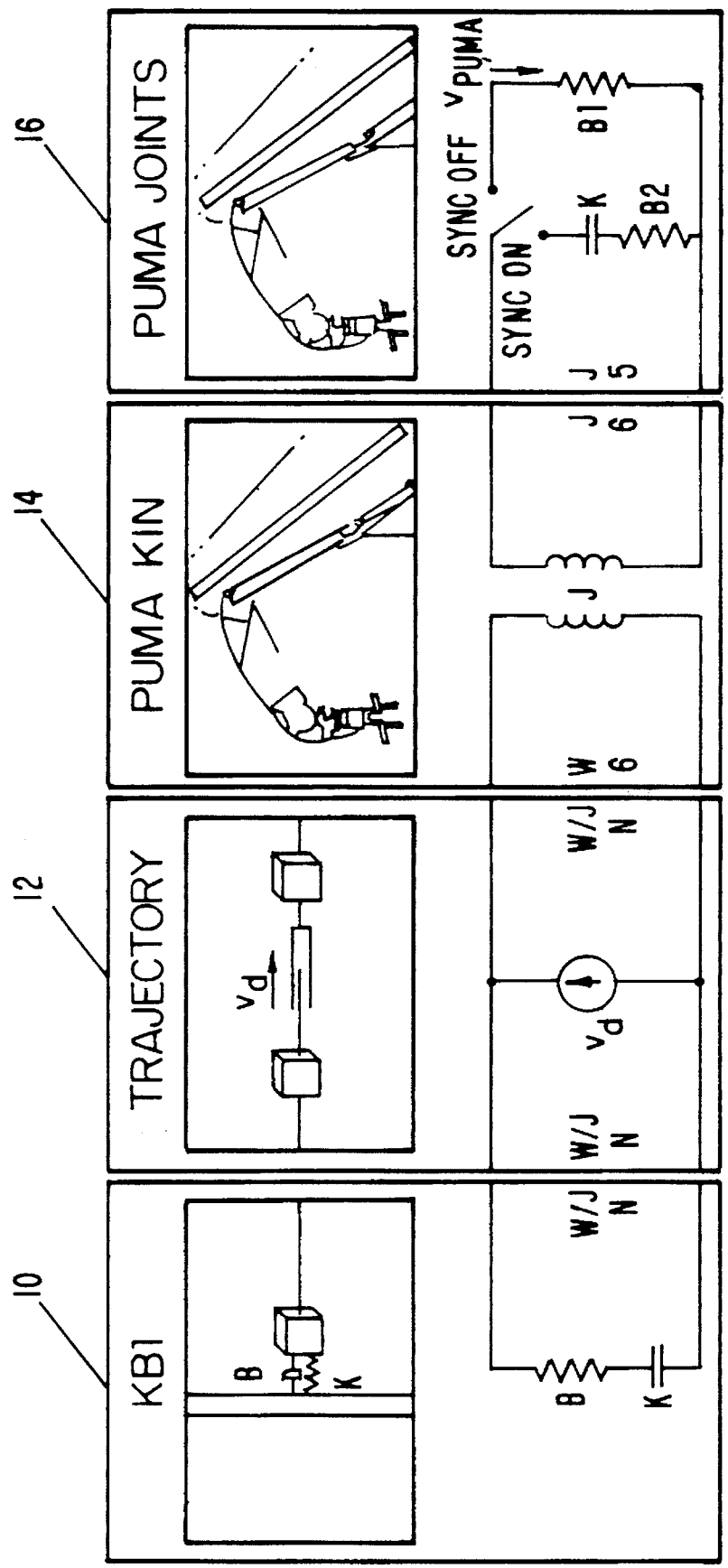

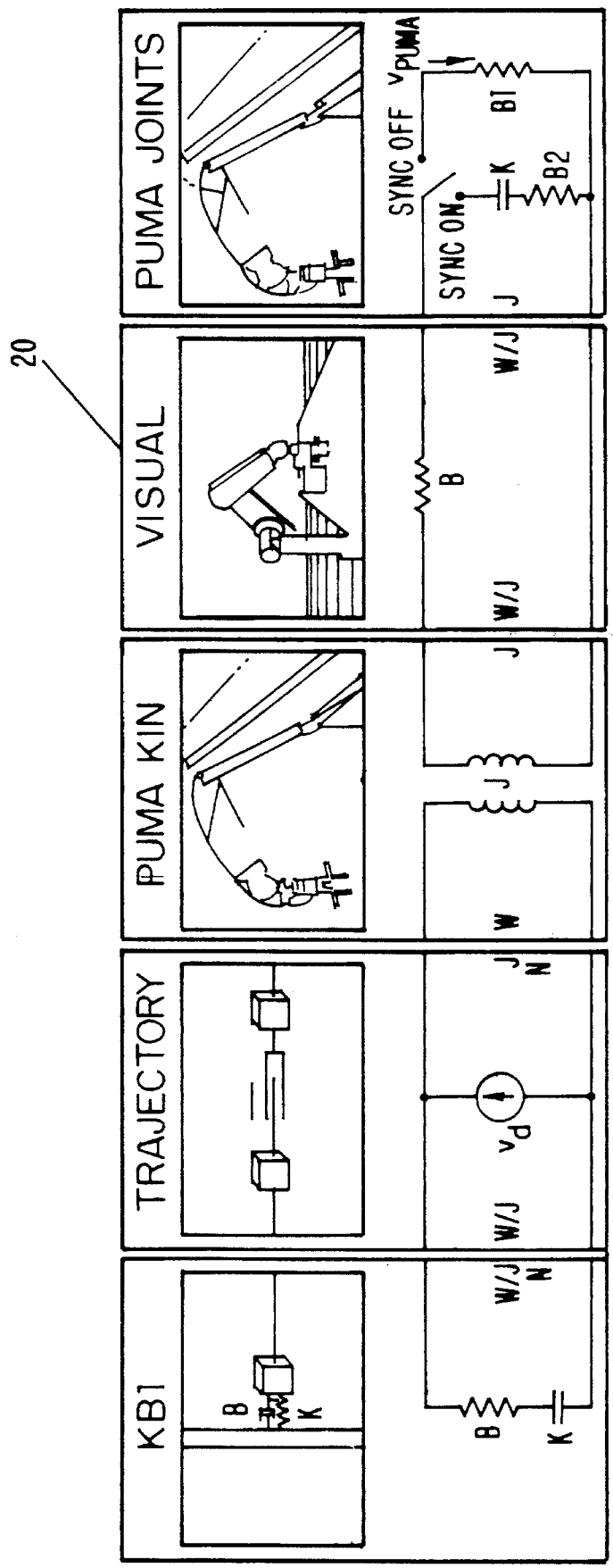

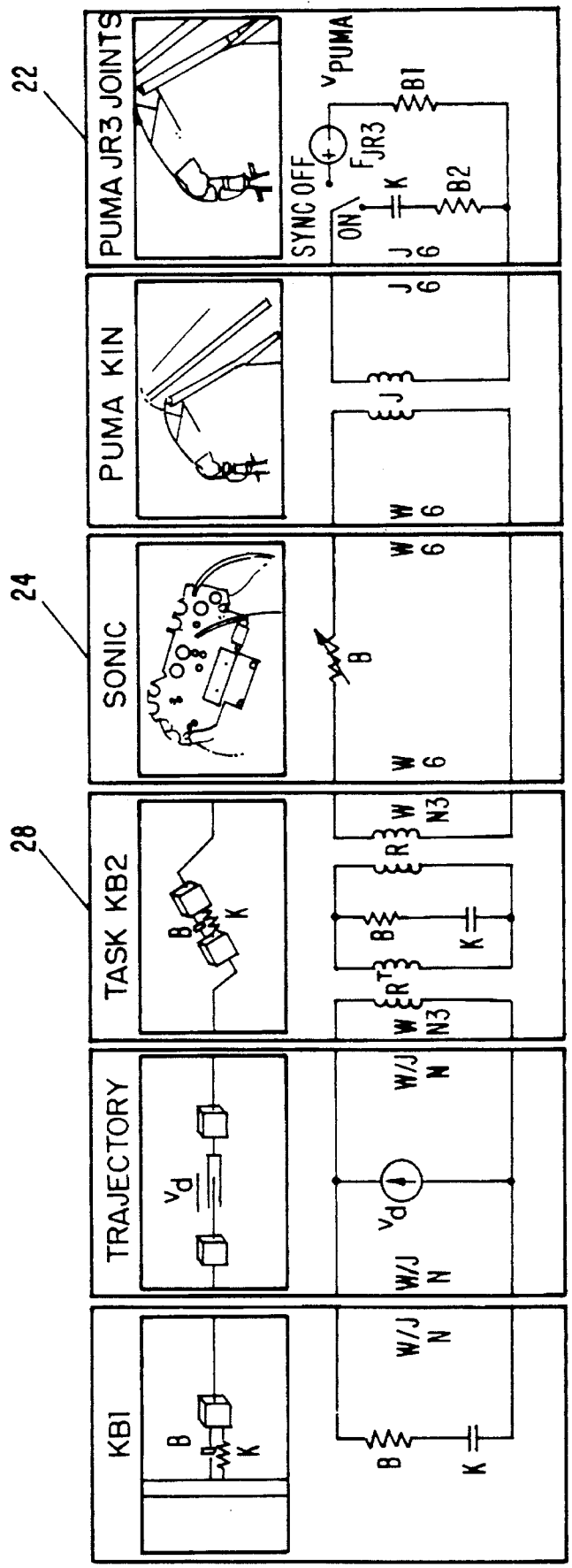

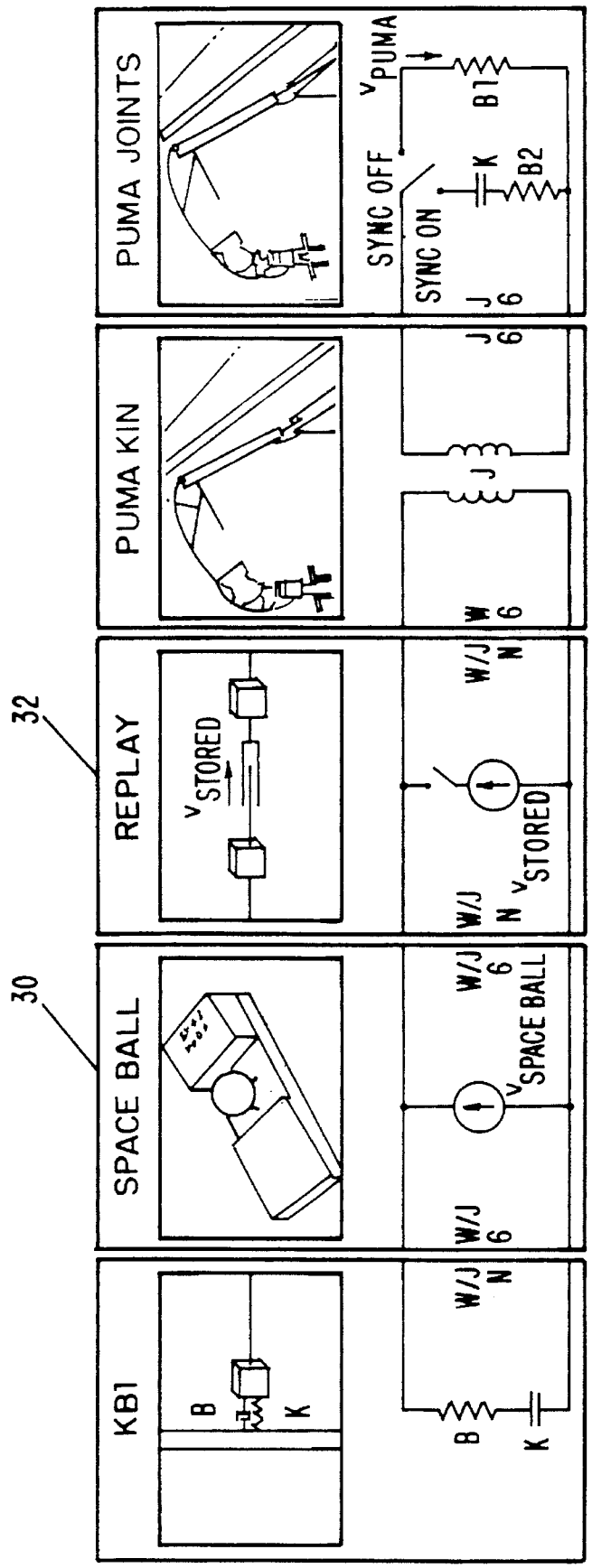

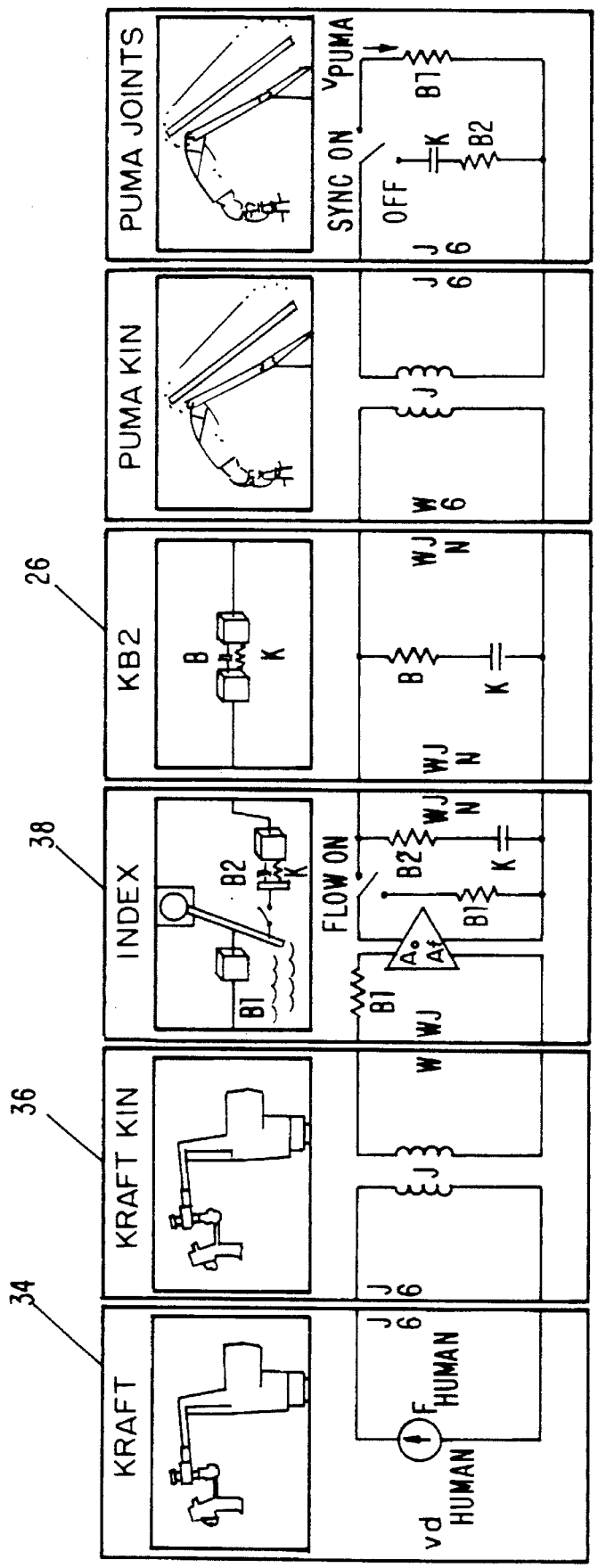

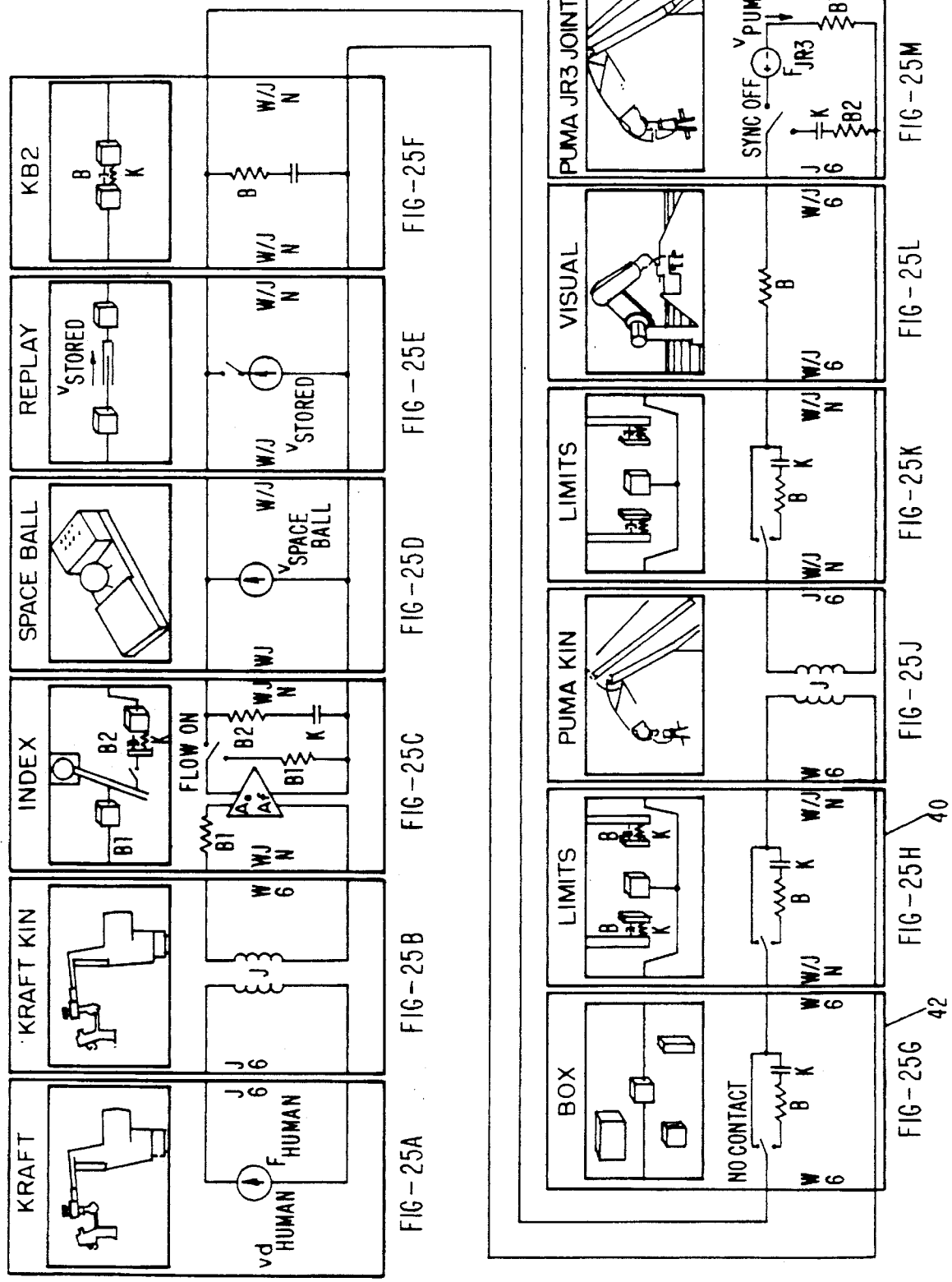

MODULAR ARCHITECTURE FOR ROBOTICS AND TELEOPERATION

GOVERNMENT RIGHTS

The U.S. Government has a-paid-up license to this invention and the right in limited circumstances to require the patent owner to license others on reasonable terms.

CROSS-REFERENCE TO RELATED APPLICATIONS

This application is a continuation application of U.S. patent application Ser. No. 08/101,996, entitled Modular Architecture for Robotics and Teleoperation, to Anderson, filed on Aug. 4, 1993, abandoned the teachings of which are incorporated herein by reference.

BACKGROUND OF THE INVENTION

1. Field of the Invention (Technical Field)

The present invention relates to methods and apparatuses for controlling and permitting communications between components of robotic systems.

2. Background Art

Technical advances in the field of robotics have occurred at an enormous rate during the past three decades. Unfortunately, the advances have occurred in a technological environment requiring generation of hardware and software substantially from scratch for each actual robotic system. This is due to the fact that no general modular architecture exists for development of robotic systems.

It has not heretofore been possible to design components of robotic/telerobotic control systems independently. Instead, the entire system had to be analyzed as a whole. Furthermore, because of the inherent nonlinearities of telerobotic systems, the difficulties involved in sampling, and the complexity of such systems, there was a practical limit to the number of features that could be included in such systems.

The present invention relates to several topics in the robotics literature, including open architecture control systems, telerobotic control systems, passivity based control systems, sensor integration, graphical control, and impedance control.

A number of researchers have introduced open architecture control systems for robots based on UNIX and C. Some have involved use of generic robot controllers. V. Hayward and R. Paul, "Robot Manipulator Control Under UNIX RCCL: A Robot Control 'C' Library," *International Journal of Robotics Research*, vol. 5, pp. 94–111, 1986; L. Salkind, "The SAGE Operating System," *IEEE International Conference on Robotics and Automation*, pp. 860–865, 1989; E. M. Sollbach and A. A. Goldenberg, "Real-Time Control of Robots: Strategies for Hardware and Software Development," *Robotics & Computer-Integrated Manufacturing*, vol. 6, pp. 323–329, 1989; D. B. Stewart, D. E. Schmitz and P. K. Khosla, "Implementing Real-Time Robotic Systems Using CHIMERA II," *IEEE International Conference on Robotics and Automation*, pp. 598–603, 1990. Others have developed high-level interfaces to existing controllers. D. J. Miller and R. C. Lennox, "An Object-Oriented Environment for Robot System Architectures," *IEEE International Conference on Robotics and Automation*, pp. 352–361, 1990. These systems have been designed primarily for robotic control, and thus focus on issues such as task planning, programmability, and sensor interfacing. The present invention does not plan tasks nor optimize the control architecture for particular sensors. Instead, it provides an intuitive, reconfigurable environment for telerobotics, with ample capability for incorporation of a high-level task planner.

In the area of telerobotic control architectures, a number of open architectures have been proposed for controlling unilateral systems, i.e., those in which the operator is not dynamically coupled to the robot. P. T. Boissiere and R. W. Harrigan, "An Alternative Approach to Telerobotics: Using a World Model and Sensory Feedback," *Third Topical Meeting on Robotics and Remote Systems*, pp. 1–9, 1989; R. A. Brooks, "A Robust Layered Control System for a Mobile Robot," *IEEE Journal of Robotics and Automation*, vol. RA-2, pp. 14–23, 1986; S. Graves, L. Ciscon and J. D. Wise, "A Modular Software System for Distributed Telerobotics," *IEEE International Conference on Robotics and Automation*, pp. 2783–2785, 1992; R. Lumia, J. Fiala and A. Wavering, "The NASREM Robot Control System Standard," *Robotics & Computer-Integrated Manufacturing*, vol. 6, pp. 303–308, 1989. The present invention works at a lower level than unilateral control systems and provides a framework for developing sophisticated real-time dynamic behavior in bilateral telerobotic systems.

Work has been done in building high-performance bilateral teleoperation systems using special purpose hardware. P. G. Backes and K. S. Tso, "UMI: An Interactive Supervisory and Shared Control System for Telerobotics," *IEEE International Conference on Robotics and Automation*, pp. 1096–1101, 1990; A. Bejczy and Z. Szakaly, "Universal Computer Control System (UCCS) for Space Telerobots," *IEEE International Conference on Robotics and Automation*, pp. 318–324, 1987; S. Hayati, T. Lee, K. Tso and P. Backes, "A Testbed for a Unified Teleoperated-Autonomous Dual-Arm Robotic System," *IEEE International Conference on Robotics and Automation*, pp. 1090–1095, 1990. The present invention works at a higher level than these bilateral systems, allowing greater discretion in choosing robots and sensors, and also looser couplings between master and slave.

The underlying control equations of the present invention are based on passive two-port elements. Passive system behaviors have long been used as a model for controlling autonomous systems, N. Hogan, "Impedance Control: An Approach to Manipulation," *ASME Journal of Dynamic Systems and Control*, vol. 107, pp. 1–7, 1985, and have recently been applied to bilateral continuous teleoperation systems. R. J. Anderson and M. W. Spong, "Bilateral Control of Teleoperators with Time Delay," *IEEE Transactions on Automatic Control*, vol. 34, pp. 494–501, 1989; J. E. Colgate, "Power and Impedance Scaling in Bilateral Manipulation," *IEEE International Conference on Robotics and Teleoperation*, pp. 2292–2297, 1991; G. Raju, G. C. Verghese and T. B. Sheridan, "Design Issues in 2-port Network Models of Bilateral Remote Manipulation," *IEEE International Conference on Robotics and Automation*, pp. 1316–1321, 1989. A passive telerobotic controller can be proved stable in spite of the non-linear behavior of the operator, the robot, and the environment. R. J. Anderson and M. W. Spong, "Asymptotic Stability for Force Reflecting Teleoperators with Time Delay," *The International Journal of Robotics Research*, vol. 11, pp. 135–149, 1992.

The present invention is of a discrete real-time architecture providing for both stability and modularity of robotic systems. The invention solves the problems discussed above.

SUMMARY OF THE INVENTION
(DISCLOSURE OF THE INVENTION)

The present invention is of a modular robotics system and a method for controlling the system, comprising: providing at least one manipulator to the system; providing a plurality of modules to the system; decomposing the modules into either linear time invariant uncoupled dynamic or nonlinear coupled memoryless elements, the elements being independently discretized; and passing wave variables between the modules. In the preferred embodiment, the invention further comprises passing between the modules position information corresponding to a current position of the manipulator. The behavior of each of the modules is passive and is represented by a scattering operator and each of the modules is decomposed into either linear time invariant uncoupled dynamic elements by a scattering operator upon which a bilinear map substitution has been performed or into nonlinear coupled memoryless elements by a scattering operator of Jacobians or damping terms.

The invention is also of a robotics system and a method for controlling the system, comprising: providing at least one manipulator to the system; providing a plurality of modules to the system; passing information between the modules; and controlling movements of the manipulator by bilateral teleoperation. In the preferred embodiment, wave variables and position information corresponding to the current position of the manipulator are passed between the modules. The behavior of each of the modules is passive and is represented by a scattering operator and each of the modules is decomposed into either linear time invariant uncoupled dynamic elements by a scattering operator upon which a bilinear map substitution has been performed or into nonlinear coupled memoryless elements by a scattering operator of Jacobians or damping terms.

A primary object of the present invention is to provide a modular architecture for discrete real-time dynamic control of bilateral telerobotic systems.

A primary advantage of the present invention is that it provides for rapid prototyping and synthesis of telerobotic systems.

Another advantage of the present invention is that it provides for guaranteed stability of the robotic system even with arbitrary time delays, sampling rates, and asynchronous communication.

A further advantage of the present invention is that it can be implemented on multiple relatively inexpensive computers rather than on a single high-performance computer.

An additional advantage of the present invention is that it can achieve greater complexity and permits more features than a non-modular system.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 20 is a diagram of an autonomous robot controller for Puma robot hardware;

FIG. 21 is a diagram of the system of FIG. 20 additionally incorporating a previewing/monitoring module;

FIG. 22 is a diagram of the system of FIG. 20 additionally incorporating force feedback modules;

FIG. 23 is a diagram of the system of FIG. 20 additionally incorporating real-time operator input modules;

FIG. 24 is a diagram of the system of FIG. 20 additionally incorporating force reflection modules; and FIG. 25 is a diagram of a system incorporating the modules of FIGS. 20–24 and additionally incorporating world model modules.

Figure 1:
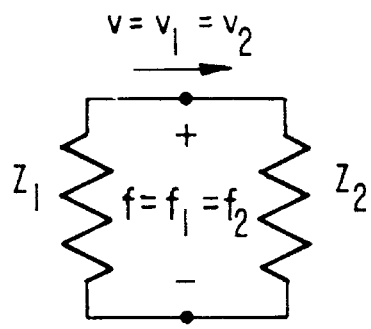
FIG. 1 is a diagram of a system of two continuous linear time invariant networks with impedances $Z_1$ and $Z_2$.

DESCRIPTION OF THE PREFERRED EMBODIMENTS (BEST MODES FOR CARRYING OUT THE INVENTION)

The present invention is of a discrete time modular architecture for integrating-sensors, actuators, input devices, and world model information into a bilateral telerobotic system. By providing modularity and guaranteed stability for arbitrary connections, the present invention permits independent design of robot control systems and provides for the inherent nonlinearitites of telerobotic systems, difficulties involved in sampling, and the complexity of modern systems. The system designer need only follow the criterion for a module of the present invention, or follow the design methodology for the modules of the present invention, and know that when connected, the system will perform in a stable fashion. Furthermore, if reasonable sample times are maintained, then the end user can be assured that the discrete system will approach the behavior of a desired continuous system. The present invention also provides for computation in parallel and at asynchronous rates, permitting flexibility in computing power.

In teleoperation, the slave robot directly tracks motion commanded by a human operator. In robotics, a robot follows trajectories generated by a computer program. "Telerobotics" is a term for describing machine based manipulation using both computer control ("robotics") and direct human input ("teleoperation"). The present invention enables the entire spectrum of telerobotics ranging from teleoperation to robotics.

Bilateral telerobotics is a special class of telerobotics in which forces, either measured directly from force sensors, generated indirectly from proximity sensors, or artificially created using world models, are conveyed to the operator via a force-reflecting master input device. Bilateral teleoperation has shown great promise in laboratories, reducing task times and forces incurred during contact tasks, but has so far failed to achieve wide-spread commercial success.

A robot system will be considered "unstable" if the robot continues to move with increasing kinetic energy, even after a commanded velocity profile has halted. A robot system is "stable", and is said to exhibit "stability", if no initial conditions or initial velocity profiles exist which will cause the system to go unstable. For stricter definitions see the Lyapunov stability arguments in "Asymptotic Stability for Force-Reflecting Teleoperators with Time Delay," *The International Journal of Robotics Research*, vol. 11, pp. 135–149, 1992.

The ability to mix and match modules in a teleoperator system is an invaluable tool for the system designer. This allows independent development and testing of modules by multiple researchers, the rapid synthesis of telerobotic systems, and systems with much greater complexity than could be achieved by prior art, non-modular techniques. This capability benefits technological development in a wide variety of robotics applications, including waste storage tank remediation, buried waste retrieval, undersea operations, microsurgery, and hazardous activities performed by, for example, NASA, commercial reactor maintainers, and offshore oil rig personnel. Furthermore, the present invention benefits development of improved flight and driving simulators.

The present invention employs a continuous time model of a two-port network for purposes of designing behaviors into a telerobotic system. Modules are represented by continuous time circuit elements and are broken into one-port and two-port elements. When joined together, the elements form a complete circuit. The advantages of two-port networks are that they give a compact representation, directly illustrate the passive nature of the underlying control laws, and are intuitively understood by a large audience.

In order to discretize the system and maintain a close approximation to a desired continuous response, the present invention incorporates the following elements: The system is decoupled into segments which have either linear time invariant (LTI) uncoupled dynamic behavior or nonlinear coupled memoryless behavior. "Dynamic" segments are associated with energy, storage, while "memoryless" segments are not. Each module is converted to scattering matrix form using wave variables ($a_p$, $b_p$, $a_n$ and $b_n$) as inputs and outputs. The dynamic LTI subsystems are converted to discrete time operators by applying Tustin's method, which maintains the passivity of the scattering operator. Nonlinear memoryless coupled elements are represented as either Jacobians (J) or damping terms (B). Full matrix valued scattering operators for these operators are derived directly from the constituent equations. Because the output of a scattering operator does not lose its passivity when delayed, any amount of time delay in communicating data between modules can be tolerated. In addition to the wave variables, each port passes position information forward to the next module. The present invention insures, however, that the flow of position information does not create a feedback loop. By using wave variables for passing all feedback information, and by designing each module to have a discrete time mapping which maintains passivity for any time delay, the present invention provides for a modular discrete time architecture for robotics and telerobotics.

No existing system provides a modular architecture for discrete real-time dynamic control of bilateral teleoperator systems. Current semi-modular software architectures for teleoperation do not deal with either dynamic control (i.e., direct control of manipulator impedance values) or with bilateral teleoperation. Current bilateral teleoperator systems are not modular in that a master is coded to work with a particular slave, portions of the control system are not easily parallelized, and the control systems cannot work at asynchronous rates.

The present invention is based upon the following basic approach to creating a stable and modular telerobotic control system: combining scattering operators with Tustin's method to obtain modules which are passive for any delay. This approach is set forth below. A basis for understanding the approach is set forth by R. J. Anderson and M. W. Spong "Bilateral Control of Teleoperating with Time Delay," IEEE Transactions on Automatic Control, Vol. 34, 1989, and "Asymptotic Stability for Force Reflecting Teleoperators with Time Delay," International Journal of Robotics Research, Vol. 11, No. 2, 1992, which are herein incorporated by reference.

Figure 2:
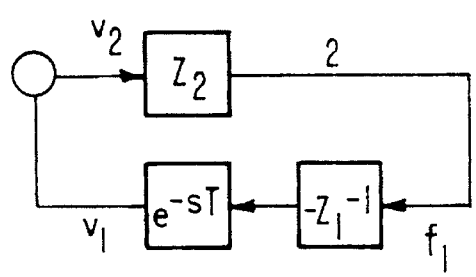
FIG. 2 is a diagram of the system of FIG. 1 as simulated by a computer as two separate modules.

Suppose one has two continuous LTI networks with impedances $Z_1$ and $Z_2$ respectively as shown in FIG. 1, and one would like to have a computer simulate the system as two separate modules. Using f and v as variables one gets the feedback structure shown in FIG. 2 where $e^{-sT}$ represents a delay inherent in sampling. This system may become unstable since $e^{-sT}Z^{-1}(s)$ is no longer passive. For example let $Z_1=B_1$, $Z_2=B_2$ and $e^{-sT}=d$, the unit delay operator. Then the characteristic equation for the system is $1+Z_2Z_1^{-1}e^{-sT}=1+(B_2/B_1)d$ which will be unstable if $B_2>B_1$.

$$a_1 = f_1 - Z_0 v \qquad b_1 = f_1 + Z_0 v$$
$$a_2 = f + Z_0 v \qquad b_2 = f - Z_0 v$$
$$S_1 = \frac{Z_1 - Z_0}{Z_1 + Z_0} \qquad S_2 = \frac{Z_2 - Z_0}{Z_2 + Z_0}.$$

Figure 3:
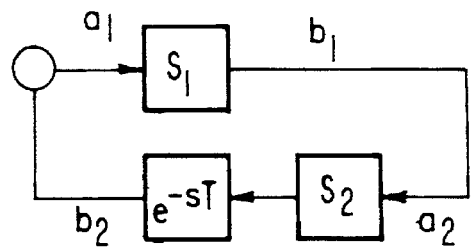
FIG. 3 is a diagram of a system which is passive for any time delay and any passive impedance.

By passing wave variables between modules, rather than force and velocity, one cannot be affected by sample delays and passivity still remains. For instance, the system shown in FIG. 3 will be stable for any time delay and any passive impedance. A stable system is one in which the energy out of the system will be less than or equal to the energy put in. The system of FIG. 3 will be stable because $Z_i$ is passive and then $$Z_i(jw) \geq 0 \, \forall w \Leftrightarrow \|S(jw)\| = \left\| \frac{Z(jw) - Z_0}{Z(jw) + Z_0} \right\| \leq 1$$

but $$\|S(jw)\| \leq 1 \Leftrightarrow \|e^{-sT}\| \, \|S(jw)\| \leq 1 \Leftrightarrow \|e^{-sT}S(jw)\| \leq 1.$$

For the example case $Z_1 = B_1$ and $Z_2 = B_2$ one gets $$S_1 = \left( \frac{B_1 - Z_0}{B_1 + Z_0} \right) = \alpha_1 \quad S_2 = \left( \frac{B_2 - Z_0}{B_2 + Z_0} \right) = \alpha_2$$

$$-1 < \alpha_1, \alpha_2 < 1$$

and the characteristic equation is $$1 - S_1 S_2 e^{-sT} = 1 - (\alpha_1 \alpha_2) d$$
$$1 - S_1 S_2 e^{-sT}$$

which is always stable.

Figure 4:
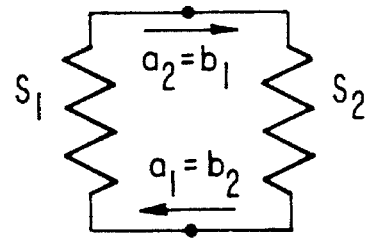
FIG. 4 is a diagram of a connection of two one-port modules.
Figure 5:
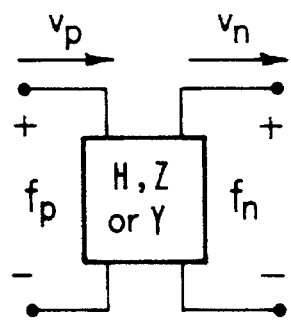
FIG. 5 is a diagram of the system of FIG. 4 with a two-port connection.

The network in FIG. 4 represents a connection of two one-ports. A generic two-port connection is shown in FIG. 5.

A two-port can be represented in myriad ways, as an impedance, an admittance and in two different hybrid forms. All of these can be mapped to a scattering form as shown in Table 1.

$T: S_c \rightarrow S_d$, which maintains passivity upon discretization, namely $$\|S(jw)\| \leq 1 \, \forall w \rightarrow^T \|S_d(d)\| = \|S_d(e^{j\epsilon})\| \leq 1 \, \forall \Theta \in [0, 2\pi]$$

where $d = e^{-sT}$ is the delay operator, and $S_d$ is the discrete time version of the continuous scattering operator $S_c$. By using a bilinear map substitution (i.e., Tustin's method)

$$s = \frac{2}{T} \left( \frac{1-d}{1+d} \right)$$

passivity is maintained.

Let $S_d(d)$ be the scattering matrix obtained from applying Tustin's method to a passive continuous scattering matrix $S_c(s)$. To compute the norm of $S_d(d)$ one takes $$\|S_d(d)\| = \max_\Theta \|S_d(e^{j\Theta})\| \Theta \in [-\pi, \pi] =$$

$$\max_\Theta \left\| S_c \left( \frac{2}{T} \left( \frac{1 - e^{j\Theta}}{1 + e^{j\Theta}} \right) \right) \right\| \Theta \in [-\pi, \pi]$$

TABLE 1

| Type | Equation | Scattering Matrix | Inverse |
|---|---|---|---|
| Impedance | $\begin{bmatrix} f_p \\ f_n \end{bmatrix} = Z \begin{bmatrix} v_p \\ -v_n \end{bmatrix}$ | $S = (Z - Z_0)(Z + Z_0)^{-1}$ | $Z = (I + S)(I - S)^{-1} Z_0$ |
| Admittance | $\begin{bmatrix} v_p \\ -v_n \end{bmatrix} = Y \begin{bmatrix} f_p \\ f_n \end{bmatrix}$ | $S = (I - Z_0 Y)(I + Z_0 Y)^{-1}$ | $Y = Z_0^{-1}(I - S)(I + S)^{-1}$ |
| Hybrid | $\begin{bmatrix} f_p \\ -v_n \end{bmatrix} = H \begin{bmatrix} v_p \\ f_n \end{bmatrix}$ $H' = \begin{bmatrix} 1 & 0 \\ 0 & Z_0 \end{bmatrix} H \begin{bmatrix} 1/z_0 & 0 \\ 0 & 1 \end{bmatrix}$ | $\begin{bmatrix} 1 & 0 \\ 0 & -1 \end{bmatrix} (H' - I)(H' + I)^{-1}$ | $H' = \left( I + \begin{bmatrix} 1 & 0 \\ 0 & -1 \end{bmatrix} S \right) \left( I - \begin{bmatrix} 1 & 0 \\ 0 & -1 \end{bmatrix} S \right)^{-1}$ $\begin{bmatrix} 1 & 0 \\ 0 & 1/z_0 \end{bmatrix} H' \begin{bmatrix} Z_0 & 0 \\ 0 & 1 \end{bmatrix}$ |

Each sensor, robot, filter, input device, or other behavior, which is to be incorporated into the architecture of the present invention is first represented as a continuous domain one-port or two-port module containing passive network elements and independent sources. The continuous model represents the ideal behavior that the architecture should achieve. Such representation has been shown to provide a stable method to develop teleoperator systems. In the present invention the passive, stable properties of the continuous system can be preserved upon discretization in such a way that two-port and one-port modules can be individually specified and designed, and then combined in an asynchronous, distributed computing environment.

It is a basic principle of the architecture of the present invention to separate the ideal continuous time two-ports and one-ports into either uncoupled, linear, time-invariant, dynamic network elements (i.e., ideal springs and masses), or memoryless coupled, nonlinear network elements (i.e., Jacobians and nonlinear dampers). This is the PHIDE concept discussed in Anderson and Spong, "Asymptotic Stability for Force Reflecting Teleoperators with Time Delay." Once such a decomposition has been conducted, then the system can be discretized using the techniques laid out in this document.

LTI impedances, $Z_1$, are given as continuous time operators, e.g., $Z(s) = Ms + B_1$ and $Z = B + K/s$. One wants a map, -continued but $$\frac{1 - e^{j\Theta}}{1 + e^{j\Theta}} = j \tan(e).$$

Making the variable substitution $w = \tan(\Theta)$ we get $$\|S_d(d)\| = _w{}^{max}\|S_c(jw)\| \, w \in [-\infty, \infty] = \|S_c(\Theta)\|.$$

Thus, because $\|S_c(\Theta)\| \leq 1$ and $\|S_d(d)\| \leq 1$, the sampled system is passive. As an example, let $$Z(s) = Ms + B \text{ and } S_c(s) = \frac{Ms + B - Z_0}{Ms + B + Z_0}$$

and then it follows that:

$$Re[Z(j\omega)] = B \geq 0 \quad \omega \text{ and } \|S(j\omega)\|^2 =$$

$$\frac{(M\omega^2 + B^2 - Z_0^2)^2 + 2M\omega Z_0}{(M^2\omega^2 + (B + Z_0)^2)^2} \leq 1 \quad \omega.$$

Applying Tustin's method, $$Z(d) = M \frac{2}{T} \left( \frac{1-d}{1+d} \right) + B$$

-continued and $$S(d) = \frac{2M(1-d) + (B-Z_0)T(1+d)}{2M(1-d) + (B+Z_0)T(1+d)} = \frac{(2M + (B-Z_0)T) - d(2M - BT + Z_0T)}{(2M + (B+Z_0)T) - d(2M - BT - Z_0T)}.$$

This can be shown to satisfy the norm conditions. When the present invention is controlling systems having more than one degree-of-freedom (DOF) then the linear dynamic terms are assumed to be decoupled and the filters designed using the previous techniques will be applied along each DOF.

Figure 6:
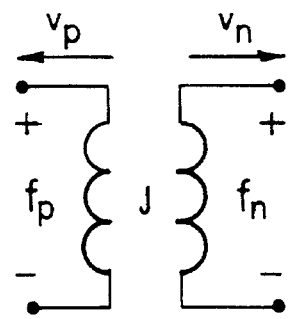
FIG. 6 is a diagram of a Jacobian represented as a transformer.

One of the important advantages of the present invention is that it is a full nonlinear system. One can show that a nonlinear system is passive using the same scattering matrix techniques. One of the most common nonlinearities is the Jacobian, $J(x_p)$ which is matrix valued (i.e., coupled Degrees of Freedom) and is functionally dependent on the position, $x_p$. One can represent the Jacobian as a transformer (see FIG. 6) with a matrix valued hybrid representation:

$$\begin{bmatrix} f_p \\ -v_a \end{bmatrix} = \begin{bmatrix} 0 & J^T \\ -J & 0 \end{bmatrix} \begin{bmatrix} v_p \\ f_n \end{bmatrix} \quad (*).$$

Here one cannot start with the equations in Table 1 directly. Instead one works from the constituent equations for the wave variables:

$$\begin{bmatrix} b_p \\ b_n \end{bmatrix} = \begin{bmatrix} f_p - Z_0 v_p \\ f_n + Z_0 v_n \end{bmatrix} = \begin{bmatrix} S_{11} & S_{12} \\ S_{21} & S_{22} \end{bmatrix} \begin{bmatrix} f_p + Z_0 v_p \\ f_n - Z_0 v_n \end{bmatrix} = S \begin{bmatrix} a_p \\ a_n \end{bmatrix}.$$

Using the equation in (*) gives:

$$\begin{bmatrix} f_p - Z_0 v_p \\ f_n + Z_0 v_N \end{bmatrix} = \begin{bmatrix} J^T f_n - Z_0 v_p \\ f_n + Z_0 J v_p \end{bmatrix} = \begin{bmatrix} S_{11} & S_{12} \\ S_{21} & S_{22} \end{bmatrix} \begin{bmatrix} J^T f_n + Z_0 v_p \\ f_n - Z_0 J v_p \end{bmatrix} \quad (**).$$

From (**) one gets:

$$\begin{bmatrix} J^T & -I \\ I & J \end{bmatrix} \begin{bmatrix} f_n \\ Z_0 v_p \end{bmatrix} = S \begin{bmatrix} J^T & I \\ I & -J \end{bmatrix} \begin{bmatrix} f_n \\ Z_0 v_p \end{bmatrix}.$$

Because $$\begin{bmatrix} J^T & -I \\ I & J \end{bmatrix} \text{ and } \begin{bmatrix} J^T & I \\ I & -J \end{bmatrix}$$

are full rank and $f_n$ and $Z_0 v_p$ are both arbitrary, it follows that $$\begin{bmatrix} J^T & -I \\ I & J \end{bmatrix} = \begin{bmatrix} S_{11} & S_{12} \\ S_{21} & S_{22} \end{bmatrix} \begin{bmatrix} J^T & I \\ I & -J \end{bmatrix} \quad (***).$$

Thus, one gets the equations $$J^T = S_{11} J^T + S_{12} - I = S_{11} - S_{12} J$$

and therefore $$S_{11} = (J^T J - I)(I + J^T J)^{-1}$$

$$S_{12} = 2J^T (I + JJ^T)^{-1}.$$

One also gets from (***) that $$S_{22} + S_{21} J^T = I \rightarrow S_{22} = (I - JJ^T)^{-1} - 2J(I + J^T J)^{-1} J^T S_{21} - S_{22} J = J \rightarrow S_{21} = 2J(I + J^T J)^{-1}.$$

In conclusion:

$$S = \begin{bmatrix} I - D & DJ^T \\ JD & I - JDJ^T \end{bmatrix} = \begin{bmatrix} I - D & J^T E \\ EJ & E - I \end{bmatrix} =$$

$$\begin{bmatrix} J^T E J - I & J^T E \\ EJ & E - I \end{bmatrix} \quad (\dagger)$$

where $D = 2(I + J^T J)^{-1}$ and $E = 2(I + JJ^T)^{-1}$

For computing S one chooses the representation with the simplest inverse D or E depending on the number of rows and columns in J. In any case the resulting S is univariate, i.e., $S^T S = I$. This is proven below:

$$S^T S = \begin{bmatrix} I - D & DJ^T \\ JD & E - I \end{bmatrix} \begin{bmatrix} I - D & DJ^T \\ JD & E - I \end{bmatrix} =$$

$$\begin{bmatrix} I - 2D + D^2 + DJ^T JD & -D^2 J^T + DJ^T E \\ -JD^2 + EJD & JDDJ^T + E^2 - 2E + I \end{bmatrix} \ddagger$$

but $D^2 + DJ^T JD = D(2D^{-1})D = 2D$ and $E^2 + EJJ^T E = 2E$ and $DJ^T = J^T E$ and therefore $S^T S = I$ and $\|S\| = 1$ for any x.

This is a powerful result. One can use Jacobians for much more than kinematics for a device. They can be used for switching non-linearities as well.

One case of a Jacobian map is particularly simple and is used frequently, namely Jacobians of one of the forms:

$$J = R, \; J = \begin{bmatrix} R & O \\ O & R \end{bmatrix} \text{ or } J = \begin{bmatrix} I & O \\ O & R \end{bmatrix}$$

where R is a changing rotation matrix. The second occurs if the whole system must be mapped into task space. The third occurs whenever two rotations must be summed. In this case the rotational velocity must be rotated by R before it can be summed with a second rotational velocity. This is discussed later.

Applying Eq. † to $J = R$ one gets $D = 2(I + J^T J)^{-1} = I$ and thus $$S = \begin{bmatrix} I - D & DJ^T \\ DJ & I - JDJ^T \end{bmatrix} = \begin{bmatrix} O & R^T \\ R & O \end{bmatrix}$$

and for $$J = \begin{bmatrix} R & O \\ O & R \end{bmatrix} S = \begin{bmatrix} O & R^T 0 \\ O & 0 R^T \\ R 0 & O \\ 0 R & O \end{bmatrix}$$

and for $$J = \begin{bmatrix} I & O \\ O & R \end{bmatrix} S = \begin{bmatrix} O & I O \\ O & 0 R^T \\ I O & O \\ O R & O \end{bmatrix}.$$

Figure 7:
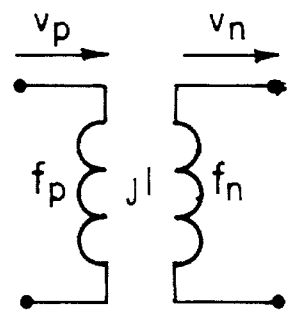
FIG. 7 is diagram illustrating the transformation of a Jacobian scattering matrix to its inverse.

The scattering matrix for $J^{-1}$ is as simple as that for J. It can be found by reversing the order of $v_p$ and $v_n$ as shown in FIG. 7. Applying Eq. ‡ one gets:

$$\begin{bmatrix} b_n \\ b_p \end{bmatrix} = \begin{bmatrix} I - D & DJ^T \\ JD & I - JDJ^T \end{bmatrix} \begin{bmatrix} a_n \\ a_p \end{bmatrix}$$

and thus $$\begin{bmatrix} b_p \\ b_n \end{bmatrix} = \begin{bmatrix} I - JDJ^T & JD \\ DJ^T & I - D \end{bmatrix} \begin{bmatrix} a_p \\ a_n \end{bmatrix}.$$

Thus, for whatever order, matrix size or nonlinearity in J, one has a closed form representation of S with no singularities and a robust method for computation. (Note: use Cholesky decomposition to compute the positive definite terms D or E.) This represents a substantial gain in the state of the art in kinematics computations for robots.

Velocity maps and feedback structures have been discussed above along with the concept of discrete modules having a scattering operator with norm less than or equal to one. For robot control, however, one must be concerned with position tracking. In theory, one can get position data from integrating the velocities. In practice, one would always be accumulating errors. Therefore, position data must be passed as well. The key to such a technique is to feedforward the position data and feedback the wave variables. Each module should require that $\|S(d)\| \leq 1$ for any position input. This philosophy is shown in FIG. 8.

Figure 8:
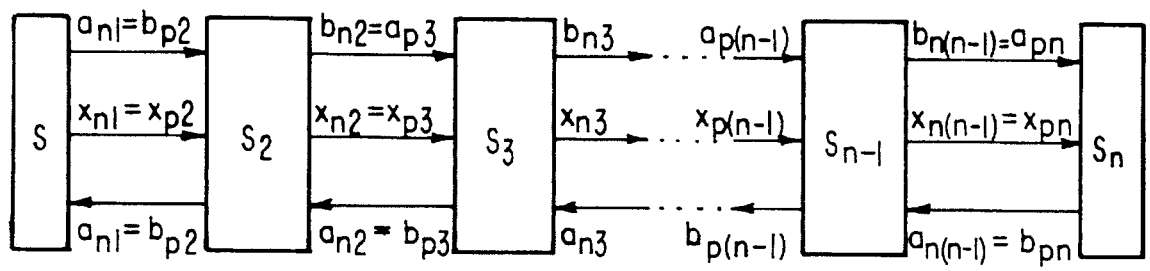
FIG. 8 is a diagram illustrating the passing of information between the modules of the present invention.

Referring to FIG. 8, the initial module has one input, $a_{n1}$, and two outputs, $b_{n1}$ and $x_{n1}$, each two-port has three inputs, $a_{p1}$, $a_{n1}$ and $x_{p1}$ and three outputs $b_{p1}$, $b_{n1}$ and $x_n$, and the final part has two inputs, $a_p$ and $x_p$, and one output $b_p$. If the modules maintain the passivity of $S(d,x_p)$ for all $x_p$ then the feedback stability will be guaranteed. The module should then compute the feedforward term $x_n = f(x_p, a_p, a_n)$ for each two-port, and $x_n = f(a_n)$ for the initial one-port. By convention, one would like the input devices to be located towards the left of the circuit and the output device/devices towards the right side of the circuit; thus the flow is directed from left to right. To start the flow in the proper direction one generally initializes the network with either a capacitive port (e.g., a spring damper) or a position/velocity input device. To illustrate these techniques for computing $a_n$ and $x_n$, the KB1 port of FIG. 9 will be developed next.

Figures 9, 10:
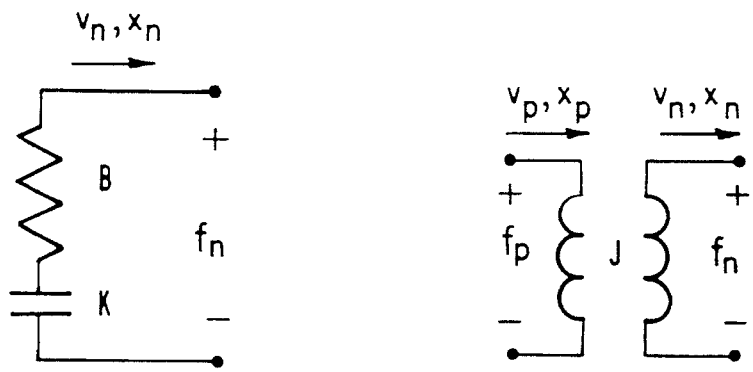
FIG. 9 is a diagram of a spring-damper system as a one-port module (KB1 Port)
FIG. 10 is a diagram of a forward kinematics port.

The KB1 port shown in FIG. 9 is an LTI, diagonal one-port which simulates a spring with stiffness K and damping B and defining equation $$f_n = -Bv_n - Kx_n \rightarrow Z =$$

$$B + K/s \text{ and } x_n = \left( \frac{f + B}{B + K/s} \right) \frac{1}{S} = \frac{f}{BS + K}$$

where B and K are diagonal matrices. Rotational elements are discussed later, but note that $\Delta \Theta_n$ can be computed from $$\frac{f}{B + K/S} = \left( \frac{a_n}{B + Z_0 + K/S} \right)$$

and the generated quaternion, $q_n$ from $\Delta \Theta_n$.)

Applying Tustin's method and the bilinear transformation of Z one gets $$b_n(d) = S_n(d) a_n(d) = \left( \frac{Z(K) - Z_0}{Z(K) + Z_0} \right) a_n(d) = \left( \frac{B + K \frac{T}{2} \left( \frac{1+d}{1-d} \right) - Z_0}{B + K \frac{T}{2} \left( \frac{1+d}{1-d} \right) + Z_0} \right) a_n(d)$$

$$= \left( \frac{2(B - Z_0)(1 - d) + KT(1 + d)}{2(B + Z_0)(1 - d) + KT(1 + d)} \right) a_n(d)$$

Computing $x_n(d)$ gives $$x_n(d) = \frac{a_n(d)}{(B + Z_0)S + K} = \frac{a_n(d)}{(B + Z_0) \frac{2(1-d)}{1+d} + K} = \frac{a_n(d)(1 + d)}{2(B + Z_0)(1 - d) + K(1 + d)}.$$

For other dynamic linear circuits this technique is much the same.

For the kinematics ports one either has to compute the forward kinematics or the inverse kinematics. Thus even though the feedback structure is well-behaved, the feedforward structure has the standard kinematic problems.

Let $\Omega(x)$ represent the forward kinematics, and then $$J = \frac{d}{dx} \Omega(x).$$

Figure 11:
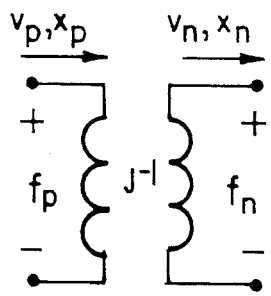
FIG. 11 is a diagram of an inverse kinematics port.

For the forward kinematics ports (see FIG. 10) one gets $$x_n = \Omega(x_p)$$

$$\begin{bmatrix} b_p \\ b_n \end{bmatrix} = \begin{bmatrix} I - D & DJ^T \\ JD & E - I \end{bmatrix} \begin{bmatrix} a_p \\ a_n \end{bmatrix}$$

and for the inverse kinematics ports (see FIG. 11) one gets $$x_n = \Omega^{-1}(x_p)$$

$$\begin{bmatrix} b_p \\ b_n \end{bmatrix} = \begin{bmatrix} I - JDJ^T & JD \\ DJ^T & I - D \end{bmatrix} \begin{bmatrix} a_p \\ a_n \end{bmatrix}.$$

Figure 12:
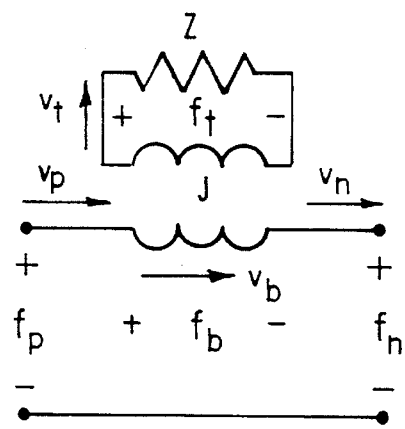
FIG. 12 is a diagram of a system having both a dynamic component and a nonlinear component.

Many modules according to the present invention (e.g., limits ports and box ports) consist of both a dynamic component and a nonlinear component. To develop these types of modules, one divides the system into subnetworks in which one port is linear and uncoupled and the other is a Jacobian connection. Consider the system in FIG. 12.

To represent this system one takes three steps:

1. Convert the two-port signals ($a_p$, $a_n$, $b_p$, $b_n$) to one-port signals ($a_b$, $b_b$).
2. Apply Jacobian mapping routines as just shown.
3. Apply linear dynamics routines as just shown.

To convert the signals consider the following control law:

$$\begin{bmatrix} b_p \\ b_n \end{bmatrix} = \begin{bmatrix} \frac{1}{3} & \frac{2}{3} \\ \frac{2}{3} & \frac{1}{3} \end{bmatrix} \begin{bmatrix} a_p \\ a_n \end{bmatrix} + \begin{bmatrix} \frac{2}{3} \\ -\frac{2}{3} \end{bmatrix} b_b(*)$$

$$a_b = \left[ \frac{3}{4} (a_p - a_n) + \frac{1}{4} (b_p - b_n) \right] d.$$

This mapping maintains passivity as is shown below. Let $b_b = S_b a_b$. Then solving (*) as a function of $S_b$ gives $$\begin{bmatrix} b_p \\ b_n \end{bmatrix} = \begin{bmatrix} \frac{1}{3} & \frac{2}{3} \\ \frac{2}{3} & \frac{1}{3} \end{bmatrix} \begin{bmatrix} a_p \\ a_n \end{bmatrix} +$$

$$\frac{2}{3} S_b d \left( \begin{bmatrix} \frac{3}{4} & -\frac{3}{4} \\ -\frac{3}{4} & \frac{3}{4} \end{bmatrix} \begin{bmatrix} a_p \\ a_n \end{bmatrix} + \begin{bmatrix} \frac{1}{4} & -\frac{1}{4} \\ \frac{1}{4} & \frac{1}{4} \end{bmatrix} \begin{bmatrix} b_p \\ b_n \end{bmatrix} \right) \to$$

$$\begin{bmatrix} 1 - \frac{Sd}{6} & \frac{Sd}{6} \\ \frac{Sd}{6} & 1 - \frac{Sd}{6} \end{bmatrix} \begin{bmatrix} b_p \\ b_n \end{bmatrix} =$$

$$\begin{bmatrix} \frac{1}{3} + \frac{Sd}{2} & \frac{2}{3} - \frac{Sd}{2} \\ \frac{2}{3} - \frac{Sd}{2} & \frac{1}{3} + \frac{Sd}{2} \end{bmatrix} \begin{bmatrix} a_p \\ a_n \end{bmatrix}.$$

Taking the inverse gives $$\begin{bmatrix} b_p \\ b_n \end{bmatrix} = \frac{\begin{bmatrix} 1 - \frac{Sd}{6} & -\frac{Sd}{6} \\ -\frac{Sd}{6} & 1 - \frac{Sd}{6} \end{bmatrix}}{1 - \frac{Sd}{3}} \begin{bmatrix} \frac{1}{3} + \frac{Sd}{2} & \frac{2}{3} - \frac{Sd}{2} \\ \frac{2}{3} - \frac{Sd}{2} & \frac{1}{3} + \frac{Sd}{2} \end{bmatrix} \begin{bmatrix} a_p \\ a_n \end{bmatrix}$$

$$= \begin{bmatrix} \frac{1 + Sdc}{3 - Sd} & \frac{2 - 2Sd}{3 - Sd} \\ \frac{2 - 2Sd}{3 - Sd} & \frac{1 + Sd}{3 - Sd} \end{bmatrix} \begin{bmatrix} a_p \\ a_n \end{bmatrix} = \begin{bmatrix} S_1 & S_2 \\ S_2 & S_1 \end{bmatrix} \begin{bmatrix} a_p \\ a_n \end{bmatrix}.$$

Using the norm bound $$\|S\|_2 \leq \sqrt{\|S\|_1 \|S\|_\infty}$$

where $$\|S\|_1 = \|S\|_\infty = \max(|S_1 + S_2|, |S_1 - S_2|)$$

$$= \max\left(1, \left|\frac{3Sd - 1}{3 - Sd}\right|\right) = 1$$

and therefore the mapping is passive. The remainder of the computation of the module in FIG. 12 requires the Jacobian and LTI techniques already introduced.

Figure 13:
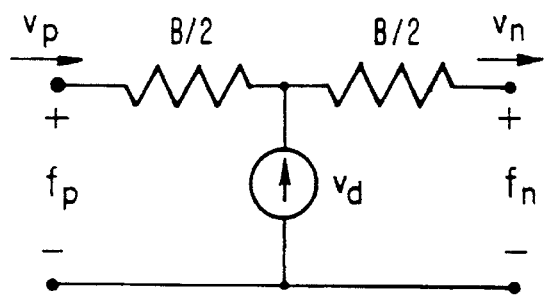
FIG. 13 is a diagram of a system having a small amount of symmetrically placed damping.

Many input modules add position and velocity to the system using an independent source. To demonstrate how this is done in the present invention, see FIG. 13 which also includes a small amount of symmetrically placed damping. The equations defining this module are given by:

$$\begin{bmatrix} b_p \\ b_n \end{bmatrix} =$$

$$\begin{bmatrix} \alpha & 1 - \alpha \\ 1 - \alpha & \alpha \end{bmatrix} \begin{bmatrix} a_p \\ a_n \end{bmatrix} + \begin{bmatrix} Z_0 v_d \\ Z_0 v_d \end{bmatrix} \text{ where } \alpha = \frac{B}{B + 2Z_0}.$$

Figure 14:
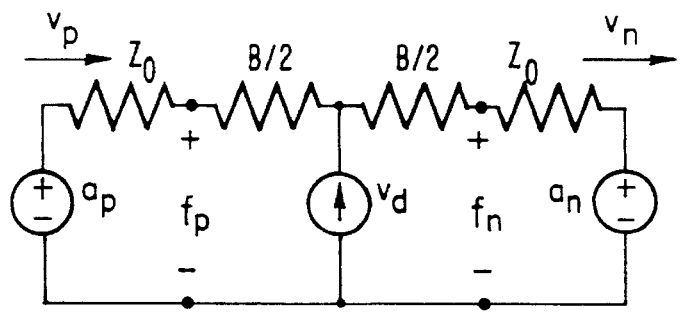
FIG. 14 is a diagram of a circuit equivalent to that of FIG. 13.

This can also be shown by applying Kirchoff's laws and superposition to the equivalent circuit in FIG. 14, as follows:

$$f_p = \left(\frac{B + Z_0}{B + 2Z_0}\right) a_p + \left(\frac{Z_0}{B + 2Z_0}\right) a_n + \frac{Z_0 v_d}{2}$$

$$Z_0 v_p = \left(\frac{Z_0}{B + 2Z_0}\right) a_p - \left(\frac{Z_0}{B + 2Z_0}\right) a_n - \frac{Z_0 v_d}{2}$$

$$b_p = f_p - Z_0 v_p = \left(\frac{B}{B + 2Z_0}\right) a_p + \left(\frac{2Z_0}{B + 2Z_0}\right) a_n + Z_0 v_d$$

$$= \alpha a_p + (1 - \alpha) a_n + Z_0 v_d$$

and by symmetry $$b_n = (1 - \alpha) a_p + \alpha a_n + Z_0 v_d.$$

In Cartesian space one can add velocity elements freely and pass only three position parameters. With rotations one needs to first rotate one of the inputs so that adding angular velocities makes sense. One also needs at least a four parameter representation for orientations for a singularity free representation.

Figure 15:
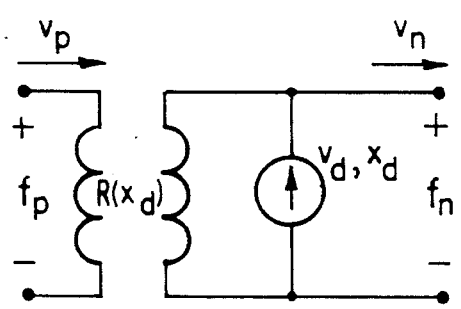
FIG. 15 is a diagram of a first circuit for adding angular velocities.
Figure 16:
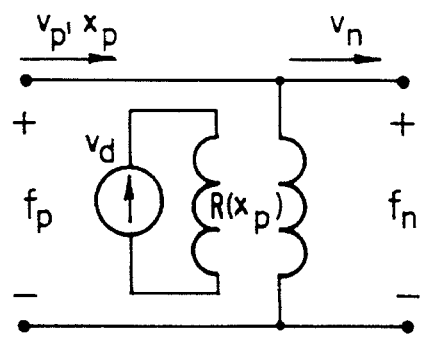
FIG. 16 is a diagram of a second circuit for adding angular velocities.

FIGS. 15 and 16 show the two valid ways for adding angular velocity. From FIG. 15 one has $$v_n = R(x_d) v_p + v_d \qquad (1)$$

$$R(x_n) = R(x_d) R(x_p) \qquad (2)$$

Note that here v=w, x=Θ and $$s(v) = \begin{bmatrix} 0 & v_s & -v_y \\ -v_z & 0 & v_x \\ v_y & v_x & 0 \end{bmatrix}$$

is a skew-symmetry operator (not a scattering operator). One can differentiate (2) to get (1), as shown below using $\dot{R}(x) = S(v) R(x)$, $$\dot{R}(x_n) = S(v_n) R(x_n) = \dot{R}(x_d) R(x_p) + R(x_d) \dot{R}(x_p) S(v_n) R(x_n) R^T(x_n) = [S(v_d) + R(x_d) S(v_p) R(x_p)] R^T(x_n) S(v_n) = S(v_d) + R(x_d) S(v_p) R^T(x_d) + S(R(x_d) v_p)$$

One can also derive the same result with quaternions $$q_n = q_p \oplus q_d.$$

Differentiating and using $$\dot{q} = \frac{1}{2} Q(q) \begin{bmatrix} o \\ w \end{bmatrix} \to \begin{bmatrix} o \\ w \end{bmatrix} = 2Q^T \dot{q}$$

where $$Q(q) = Q\left(\begin{bmatrix} q_s \\ q_v \end{bmatrix}\right) = \begin{bmatrix} q_s & -q_v \\ q_v q_s + S(q_v) \end{bmatrix} \text{ and}$$

$$q_p \oplus q_d = Q(q_p) q_d$$

one gets $$\dot{q}_n = \frac{1}{2} Q(q_n) \begin{bmatrix} o \\ w_n \end{bmatrix} Q(q_p)\dot{q}_d + Q(\dot{q}_p)q_d =$$

$$Q(\dot{q}_p)q_d + Q^*(q_d)\dot{q}_p$$

$$= Q(q_p)\frac{1}{2}Q(q_d)\begin{bmatrix} o \\ w_d \end{bmatrix} + Q^*(q_d)\frac{1}{2}Q(q_p)\begin{bmatrix} o \\ w_p \end{bmatrix}.$$

But $Q(q_n)=Q(q_p)Q(q_d)$ and therefore by multiplying by $2Q^T(q_n)$ one gets $$\begin{bmatrix} o \\ w_n \end{bmatrix} = \begin{bmatrix} o \\ w_d \end{bmatrix} + Q_d^T(q_d)Q^T(q_p)Q^*(q_d)Q(q_p)\begin{bmatrix} o \\ w_p \end{bmatrix}.$$

Applying commutivity of $Q^T(q_p)Q^*(q_d)$ gives $$\begin{bmatrix} o \\ w_n \end{bmatrix} = \begin{bmatrix} o \\ w_d \end{bmatrix} + Q^T(q_d)Q^*(q_d)\begin{bmatrix} o \\ w_p \end{bmatrix}$$

$$= \begin{bmatrix} o \\ w_d \end{bmatrix} + \begin{bmatrix} 1 & 0 \\ 0 & R(q_d) \end{bmatrix}\begin{bmatrix} o \\ w_p \end{bmatrix}.$$

Figure 17:
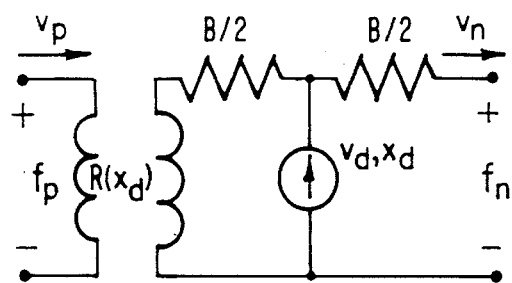
FIG. 17 is a diagram of the circuit of FIG. 15 with damping.

Redrawing FIG. 15 with damping results in FIG. 17, the standard port for adding angular velocities.

This system must be done in two sections, with the intermediate values $a_m=f_m-Z_0 v_m$ and $b_n=f_m+Z_0 v_m$. One thus gets the following equations for this port:

$$q_n = Q(q_d)q_p = q_d \oplus q_p$$

$$\begin{bmatrix} b_p \\ b_m \end{bmatrix} = \begin{bmatrix} 0 & R^T(q_p) \\ R(q_p) & 0 \end{bmatrix}\begin{bmatrix} a_p \\ a_m \end{bmatrix}$$

$$\begin{bmatrix} a_m \\ b_n \end{bmatrix} = \begin{bmatrix} \alpha & 1-\alpha \\ 1-\alpha & \alpha \end{bmatrix}\begin{bmatrix} b_m \\ a_n \end{bmatrix} + \begin{bmatrix} Z_0 & v_d \\ Z_0 & v_d \end{bmatrix}$$

where $\alpha = \frac{B}{B+Z_0}$.

To attach a slave device to a system according to the present invention, one must maintain the scattering norm conditions for the discretized system. This can be done for a common DC motor device with a PD (Proportional Derivative) control law, as follows:

$$f_m = K*(x_p - x_m) + B2*(v_p - v_m) - B1*v_m$$

wherein $f_m$ is the motor torque, $x_p$ is the motor position, $v_m$ is the motor velocity, $x_p$ is the desire position and $v_p$ is the desired velocity.

Figure 18:
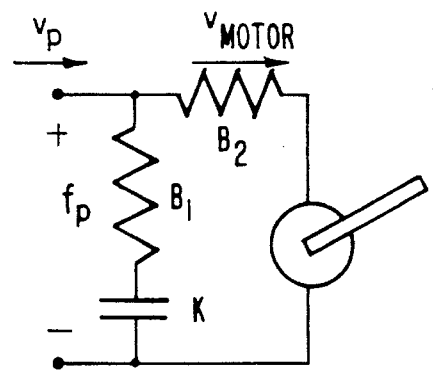
FIG. 18 is a diagram of a circuit incorporating a proportional derivative control element.

Consider the one-port network in FIG. 18. Assume that the PD loop is closed in continuous time. (Note: a dedicated servo card such as a Green Springs IP servo can achieve sample rates of approximately 4 kHz which is close enough to continuous time.) Let the input to the PD controller (with damping gains $B_1$ and $B_2$ and position gain K) be the input position $x_p$. While running the motor, record the wave $a_m = f_{motor} - Z_{motor}$. Then compute $$\begin{bmatrix} b_p^{(K)} \\ b_m^{(K)} \end{bmatrix} = S(K,B_1,B_2) \begin{bmatrix} a_p^{(K)} \\ a_m^{(K)} \end{bmatrix} \quad (*)$$

where S is the scattering operator for the LTI PD filter obtained by applying the previous principles. Because the motor is passive, it follows that $$\|b_m\| \le \|(f_m + Z_0 v_m)\| \le \|a_m\|.$$

Furthermore, $\|S\| \le 1$. Thus by taking the two-norm of (*) one gets $$\|b_p\|^2 + \|b_m\|^2 \le \|a_p\|^2 + \|a_m\|^2$$

and thus $$\|b_p\|^2 \le \|a_p\|^2$$

for any trajectory $x_p$ as long as $\dot{x}_p = v_p$.

If one must filter $x_m$ to get $v_m$ one can still get a passive system. Consider the filtered velocity with filtering constant $\gamma$.

$$\hat{v}_m = \left(\frac{e^{-sT}}{\gamma s + 1}\right) v_m = \left(\frac{e^{-sT}s}{\gamma s + 1}\right) x_m.$$

Applying the same filter to $f_m$ gives $$\hat{a}_m = \left(\frac{e^{-sT}}{\gamma s + 1}\right)(f_m + Z_0 v_m)$$

and applying this to $a_p$ gives $$\hat{a}_p = \left(\frac{e^{-sT}}{\gamma s + 1}\right) a_p.$$

Using the same filter $S(K,B_1,B_2)$ gives $$\begin{bmatrix} \hat{b}_p \\ \hat{b}_n \end{bmatrix} = S \begin{bmatrix} \hat{a}_p \\ \hat{a}_n \end{bmatrix}$$

because $$\|\hat{a}_p\| \le \|a_p\| \text{ and } \|\hat{a}_n\| \le \|b_n\|$$

and it follows that $$\|\hat{b}_p\|^2 \le \|a_p\|^2.$$

Figure 19:
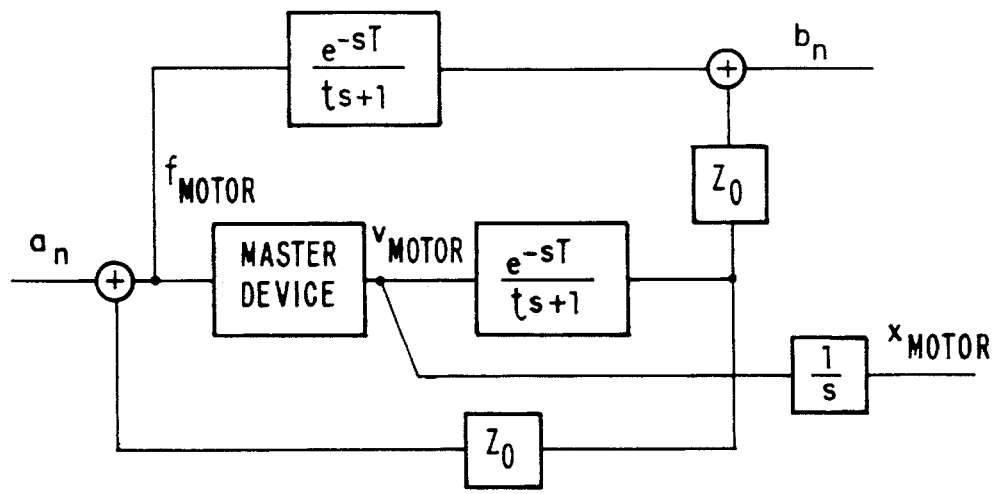
FIG. 19 is a diagram of a module for a force reflecting master.

To implement a module for a force reflecting master, one puts the master device at the initial one-port position, as in FIG. 19. One would then like to back drive the master with a force, $f_{motor}$ and record the position $x_{motor}$ and velocity $v_{motor}$ while maintaining a passive coupling.

Let the motor command be given by $$f_{motor} = a_n + Z_0 \left(\frac{e^{-sT}}{\gamma s + 1}\right) v_{motor},$$

and define the wave output by $$b_n = \left(\frac{e^{-sT}}{\gamma s + 1}\right) f_{motor} + Z_0 \left(\frac{e^{-sT}}{\gamma s + 1}\right) v_{motor}$$

and suppose the master module's impedance is given by $$f_{motor} = -(B_{motor} + Z_{motor}) v_{motor}$$

for some $B_{motor} > 0$ and any positive real $Z_{motor}$. Then it follows that for a suitably small T or suitably large filtering $\alpha$ one gets:

$$\|b_n\| = \left\|\left(\frac{e^{-sT}}{\gamma s+1}\right)(f_{motor} + Z_0 v_{motor})\right\| =$$

$$\left\|\left(\frac{e^{-sT}}{\gamma s+1}\right)(Z_0 - B_{motor} - Z_{motor})v_{motor}\right\|$$

$$\|-a_n\| = \left\|\left[B_{motor} + Z_{motor} + Z_0\frac{e^{-sT}}{\gamma s+1}\right]v_{motor}\right\|$$

and $$\|S\| = \left\|\frac{\left(\frac{e^{-sT}}{\gamma s+1}\right)(Z_0 - B_{motor} - Z_{motor})}{B_{motor} + Z_{motor} + Z_0\frac{e^{-sT}}{\gamma s+1}}\right\| \leq 1.$$

EXAMPLE CONTROL SYSTEMS AND INDUSTRIAL APPLICABILITY

The invention is further illustrated by the following non-limiting examples.

To illustrate the present invention, building up of a complex system a few modules at a time is presented below. To build a working system, one starts with an initial one-port element, connect it to any number of two-port elements, and then terminate the network with another one-port element. For a valid connection, the degrees of freedom (e.g., 1, 6, or n) and the operational space (i.e., world space or joint space) at the interface of both connected ports must match. Icons are used in the figures to represent the connections. Each icon shows both a network and a pictorial representation of the module.

Building an autonomous robot controller

FIG. 20 illustrates an autonomous robot controller 10 for Puma robot hardware constructed according to the present invention. The controller 10 comprises three primary units: a module for generating trajectories 12, a module for computing the kinematics of the device 14, and a module for driving the joint servos 16. A termination one-port module 18 completes the system.

The Trajectory Module 12 is a two-port module which generates trapezoidal velocity profiles either in joint space or in world space. In joint space, the motion is interpolated; i.e., each joint motion starts and stops at the same time. In world space, the motion is straight-line; i.e., follows a straight path in Cartesian space and tracking the shortest rotational arc.

The Puma Kin Module 14 is a two-port module which converts forces and velocities in world space to forces and velocities in joint space. This module requires the Jacobian and inverse kinematics routines for the manipulator, but does not require any information about hardware connections.

The Puma Joint Module 16 is a one-port module which maintains a direct connection to the Puma robot hardware. It drives the Puma to any position commanded. Because this module knows the true position of the slave robot, it can also be used to align or synchronize the system to an initial configuration.

The KB1 Module 18 is a one-port module which terminates the left side of the network. It simulates the dynamics of a spring-damper system with stiffness K and damping B. By providing a capacitive termination, flow is directed toward the right side of the network. By modifying the stiffness and damping parameters, impedances ranging from very compliant to very stiff can be realized.

Combining the four modules results in the autonomous robot controller system shown in FIG. 20. In addition, to realize a joint space controller for the Puma, the Puma Kin Module 14 can simply be removed.

Previewing/monitoring motion graphically

In the following sections, the capabilities of the present invention to permit rapid configuration of sophisticated telerobotic systems exceeding the capabilities of commercial systems are illustrated.

FIG. 21 illustrates the incorporation into the system of FIG. 20 of a module permitting previewing and monitoring of robot motion. Visual Module 20 first initiates communication with a remote graphics host, and then continually updates joint information in the robot display. Placing this module adjacent to an input module allows visualization of operator intent. Placing it adjacent to a slave output module allows visualization of the actual motion of the slave. FIG. 21 illustrates one possible instantiation of a motion previewing and monitoring system.

Adding sensor information

The open architecture of the present invention simplifies the attachment of sensor devices through analog, digital, and serial I/O channels. Two possible instantiations are given below.

In FIG. 22, the Puma JR3 Joints Module 22 incorporates force feedback into the system using measurements from a JR3 force sensor. The force feedback signal enables contact operations such as part insertion to be achieved using a commercial robot.

The Sonic Module 24 provides variable damping based on information obtained from a Sandia National Laboratories developed ultrasonic sensor array. It tells the operator if collision of the slave with a sensed object is imminent and will automatically slow the slave's velocity.

The KB2 Module 26 and the Task KB2 Module 28 both introduce additional compliance into the system by simulating a spring K and a dashpot B. The compliance determines how the system reacts to sensor feedback. The KB2 Module 26 works in either world space or in joint space, while the Task KB2 Module 28 works in task space by using the tool rotation matrix R.

FIG. 22 illustrates a system according to the present invention using both force sensor feedback and proximity based damping with the compliance aligned in task space. This ability to align the impedance terms in task space is commonly called impedance control.

Including operator inputs

Real-time operator input can also be incorporated into robotic systems under the present invention. Exemplary modules achieving such capability are introduced in this and the following section.

There are many types of input devices that an operator can use to control the motion of a robot. Joy sticks, teach pendants, and wands all allow some form of velocity and/or position input to the system. In this section, a module for one such device is introduced. The Space Ball Module 30 of FIG. 23 takes velocity inputs from a CIS Dimension 6 space ball and adds them to the other velocities in the system.

In order to record operator generated motions for future playback, the Replay Module 32 is provided. It first records velocities without modification. Then, upon request, it will play back the motion at a faster or slower speed. During playback, the operator can still perturb the motion using other attached modules. As with all other non-force-reflecting input modules, the Replay Module 32 utilizes a force threshold. Motions which would result in this threshold being exceeded are automatically prevented. This capability represents a crucial safety feature of the system.

FIG. 23 illustrates a system in which the operator's space ball generated motion is recorded for playback. During playback, motion from the space ball is added to the overall velocity profile to fine tune the trajectory of the slave.

Including force reflection

Although the present invention provides an excellent system integration mechanism for both autonomous and non-force-reflecting telerobotic systems, a great strength of the present invention is its ability to provide meaningful force information to the operator kinesthetically.

To implement bilateral force reflection, the Kraft Module 34 and the Kraft Kin Module 36 of FIG. 24 are employed. These modules take care of both the joint level hardware interface and the kinematics from a Kraft force-reflecting master device, respectively.

In addition, FIG. 24 includes Index Module 38, which allows the operator to index the motion of a slave device. Furthermore, this module incorporates both axis motion restriction, so that the slave robot can be constrained to move along a line, a plane, or a particular arc, and a force/position scale factor so that arbitrary power and impedance scaling is possible. FIG. 24 illustrates how a Kraft master can be used for generic bilateral force-reflection with a Puma manipulator.

Adding world model information

There are two problems with using sensor information for detecting objects in a world environment. First, because of sensor delays, noise, and non-collocation problems, it is difficult to get a high-fidelity response directly from sensors. Second, as in the case of force sensors, once contact is sensed, it may be too late to respond—the damage has been done. A partial solution to these problems is world modeling.

FIG. 25 includes two modules for incorporating world models into a system: Limits Module 40 and Box Module 42. The Limits Module 40 is a two-port module operating either in world space or joint space. It simulates a spring-damper whenever a position threshold is exceeded. It can be used to prevent the operator from exceeding the joint limits of the manipulator or from straying outside a Cartesian workcell.

The Box Module 42 is a two-port module which simulates a spring-damper whenever the slave device enters a predefined box region. In so doing, it simulates contact forces, preventing the operator from proceeding into the box. By using simulated boxes that are larger than physical objects in the environment, collisions with the environment can be avoided entirely.

FIG. 25 shows an enhanced telerobotic system with kinematics for master and slave, force and position scaling in world space, indexing with axis exclusion, space ball superposition, world modeling, record/playback, graphics display, joint limits, and force feedback. This system, constructed from discrete modules in accordance with the present invention, illustrates the great power of the present invention to provide rapid development of new and more powerful telerobotic systems in a modular manner.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A modular robotics system comprising at least one manipulator, a plurality of interchangeable and discrete operational modules, and means for passing wave variables between each of said modules and by causing retention of passivity thereby preventing instability in said system caused by computational delays within and between the modules, wherein each of said modules is decomposed into subnetworks containing either linear time invariant uncoupled dynamic or nonlinear coupled memoryless lumped parameter simulation means selected from the group consisting of an inertia simulation means (M), a stiffness simulation means (K), a linear damping simulation means (B), an independent flow source simulation means ($v_d$), an independent effort source simulation means ($f_d$), a Jacobian simulation means (J), and a nonlinear damping simulation means (B), said subnetworks being independently discretized;

wherein each of said modules comprises:
an initialization means; and
a synchronous update means mapping module inputs to module outputs via a discrete control equation to implement an action selected from the group consisting of receiving motion commands from a robot input device, receiving and processing readings from a sensor means, controlling motion of a robot by sending commands to a robot control means, implementing a motion constraint; filtering command signals, mapping force and velocity signals from one reference frame to another reference frame, and simulating a dynamic action of a robot component; and wherein each of said modules:
requires connections to other modules to complete a functional modular robotics system,
is replaceable by one or more modules to implement a different action,
is initializable and controllable separately from each other module in the modular robotics system, and
receives inputs from neighboring modules and transfers outputs to neighboring modules in an arbitrary sequence, independent of type of said neighboring modules.

2. The system of claim 1 additionally comprising means for passing between said modules position information corresponding to a current position of said manipulator.

3. The system of claim 1 wherein each of said modules is passive and at least one of said modules comprises a subnetwork containing a nonlinear coupled memoryless lumped parameter simulation means.

4. The system of claim 1 wherein each of said modules comprises a scattering operator.

5. The system of claim 4 wherein each of said modules decomposed into subnetworks containing linear time invariant uncoupled dynamic parameter simulation means comprises a scattering operator upon which a bilinear map substitution has been performed.

6. The system of claim 4 wherein each of said modules decomposed into subnetworks containing nonlinear coupled memoryless lumped parameter simulation means comprises a scattering operator comprising a member selected from the group consisting of Jacobians and damping terms.

7. A robotics system comprising at least one manipulator, a plurality of interchangeable and discrete operational modules, means for passing information between said modules comprising means for passing wave variables between each of said modules, means for maintaining stability of said system despite computational delays within and between said modules by causing retention of passivity, and means for bilateral teleoperation of said manipulator, wherein each of said modules comprises:

an initialization means; and a synchronous update means mapping module inputs to module outputs via a discrete control equation to implement an action selected from the group consisting of receiving motion commands from a robot input device, receiving and processing readings from a sensor means, controlling motion of a robot by sending commands to a robot control means, implementing a motion constraint; filtering command signals, mapping force and velocity signals from one reference frame to another reference frame, and simulating a dynamic action of a robot component; and wherein each of said module:

requires connections to other modules to complete a functional modular robotics system, is replaceable by one or more modules to implement a different action, is initializable and controllable separately from each other module in the modular robotics system, and receives inputs from neighboring modules and transfers outputs to neighboring modules in an arbitrary sequence, independent of the type of said neighboring modules.

8. The system of claim 7 additionally comprising means for passing between said modules position information corresponding to a current position of said manipulator.

9. The system of claim 7 wherein each of said modules is passive.

10. The system of claim 7 wherein each of said modules comprises a scattering operator.

11. The system of claim 10 wherein one or more of said modules comprises a linear time invariant uncoupled dynamic simulation means and a scattering operator upon which a bilenear map substitution has been performed.

12. The system of claim 10 wherein one or more of said modules comprise a nonlinear coupled memoryless simulation means and a scattering operator comprising a member selected from the group consisting of Jacobian and damping terms.

13. A method for controlling a modular robotics system comprising at least one manipulator, the method comprising the steps of:

a) initializing a plurality of interchangeable and discrete operational modules, wherein each of the modules comprises:

an initialization procedure; and a synchronous update procedure mapping module inputs to module outputs via a discrete control equation to implement an action selected from the group consisting of receiving motion commands from a robot input device, receiving and processing readings from a sensor means; controlling motion of a robot by sending commands to a robot control means, implementing a motion constraint, filtering command signals; mapping force and velocity signals from one reference frame to another reference frame, and simulating a dynamic action of a robot component; and wherein each of the modules:

requires connections to other modules to complete a functional modular robotics system is replaceable by one or more modules to implement a different action, is initializable and controllable separately from each other module in the modular robotics system, and receives inputs from neighboring modules and transfers outputs to neighboring modules in an arbitrary sequence, independent of the type of the neighboring module;

b) decomposing the modules into subnetworks containing either linear time invariant uncoupled dynamic or nonlinear coupled memoryless lumped parameter simulation procedures selected from the group consisting of an inertia simulation procedure (M), a stiffness simulation procedure (K), a linear damping simulation procedure (B), an independent flow source simulation procedure ($v_d$), an independent effort source simulation procedure ($f_d$), a Jacobian simulation procedure (J), and a nonlinear damping simulation procedure (B), the subnetworks being independently discretized; and c) passing wave variables between each of the modules and by causing retention of passivity thereby preventing instability in the system caused by computational delays within and between the modules.

14. The method of claim 13 additionally comprising the step of passing between the modules position information corresponding to a current position of the manipulator.

15. The method of claim 13 wherein the step of initializing a plurality of modules comprises initializing modules all of which are passive, at least one of which is decomposed into a subnetwork containing a nonlinear coupled memoryless lumped parameter simulation procedure.

16. The method of claim 13 additionally comprising the step of incorporating into each of the modules a scattering operator.

17. The method of claim 16 wherein the incorporating step comprises the step of incorporating into each of the modules decomposed into subnetworks containing linear time invariant uncoupled dynamic lumped parameter simulation procedures a scattering operator upon which a bilinear map substitution has been performed.

18. The method of claim 16 wherein the incorporating step comprises the step of incorporating into each of the modules decomposed into subnetworks containing nonlinear coupled memoryless lumped parameter simulation procedures a scattering operator comprising a member selected from the group consisting of Jacobians and damping terms.

19. A method of controlling a robotics system comprising at least one manipulator, the method comprising the steps of:

a) initializing a plurality of interchangeable and discrete operational modules to the system, wherein each of the modules comprises:

an initialization procedure; and a synchronous update procedure mapping module inputs to module outputs via a discrete control equation to implement an action selected from the group consisting of receiving motion commands from a robot input device, receiving and processing readings from a sensor means; controlling motion of a robot by sending commands to a robot control means; implementing a motion constraint, filtering command signals; mapping force and velocity signals from one reference frame to another reference frame; and simulating a dynamic action of a robot component, and wherein each of said modules:

requires connections to other modules to complete a functional modular robotics system, is replaceable by one or more modules to implement a different action, is initializable and controllable separately from each other module in the modular robotics system, and receives inputs from neighboring modules and transfers outputs to neighboring modules in an arbitrary sequence, independent of the type of the neighboring modules;

b) passing information between the modules by passing wave variables between each of the modules and by retention of passivity thereby maintaining stability of the system despite computational delays within and between the modules; and c) controlling movements of the manipulator by bilateral teleoperation.

20. The method of claim 19 wherein the step of passing information between the modules additionally comprises the step of passing between the modules position information corresponding to a current position of the manipulator.

21. The method of claim 19 wherein the step of initializing a plurality of modules comprises initializing modules all of which are passive.

22. The method of claim 19 additionally comprising the step of incorporating into each of the modules a scattering operator.

23. The method of claim 22 wherein the incorporating step comprises the step of incorporating into each of the modules comprising a linear time invariant uncoupled dynamic simulation procedure a scattering operator upon which a bilinear map substitution has been performed.

24. The method of claim 22 wherein the incorporating step comprises the step of incorporating into each of the modules comprising a nonlinear coupled memoryless simulation procedure a scattering operator comprising a member selected from the group consisting of Jacobians and damping terms.

* * * * *